US006134635A

United States Patent [19]
Reams

[11] Patent Number: 6,134,635
[45] Date of Patent: *Oct. 17, 2000

[54] METHOD AND APPARATUS OF RESOLVING A DEADLOCK BY COLLAPSING WRITEBACKS TO A MEMORY

[75] Inventor: Byron L. Reams, Lexington, S.C.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/987,279

[22] Filed: Dec. 9, 1997

[51] Int. Cl.[7] .............................. G06F 13/14; G06F 12/00
[52] U.S. Cl. ............................................. 711/150; 711/168
[58] Field of Search ........................... 711/141, 144, 711/150, 168

[56] References Cited

U.S. PATENT DOCUMENTS

| | | | |
|---|---|---|---|
| 4,426,681 | 1/1984 | Bacot et al. .............................. | 711/150 |
| 5,519,839 | 5/1996 | Culley et al. ........................... | 710/101 |
| 5,524,234 | 6/1996 | Martinez, Jr. et al. ................. | 711/143 |
| 5,530,835 | 6/1996 | Vashi et al. .............................. | 711/147 |
| 5,553,265 | 9/1996 | Abato et al. ............................. | 711/143 |
| 5,555,398 | 9/1996 | Raman ..................................... | 711/118 |
| 5,897,656 | 4/1999 | Vogt et al. ............................... | 711/149 |

Primary Examiner—Do Hyun Yoo
Assistant Examiner—Jan S. Williams, II
Attorney, Agent, or Firm—Blakely, Sokoloff, Taylor & Zafman LLP

[57] ABSTRACT

A method used by a first memory controller to prevent deadlock of requests to a memory having a first memory line is disclosed. The method includes the steps of (1) receiving a first memory request for the first memory line from a first bus, (2) receiving a second memory request for the first memory line from a second bus, (3) propagating the first memory request through to the second bus after the second memory request receiving step, (4) processing the second memory request by storing a first modified copy of the first memory line in the first memory controller, and (5) processing the first memory request by (a) storing a second modified copy of the first memory line in the first memory controller, and (b) transferring the second modified copy of the first memory line to a caching agent in order to satisfy the first memory request.

11 Claims, 8 Drawing Sheets

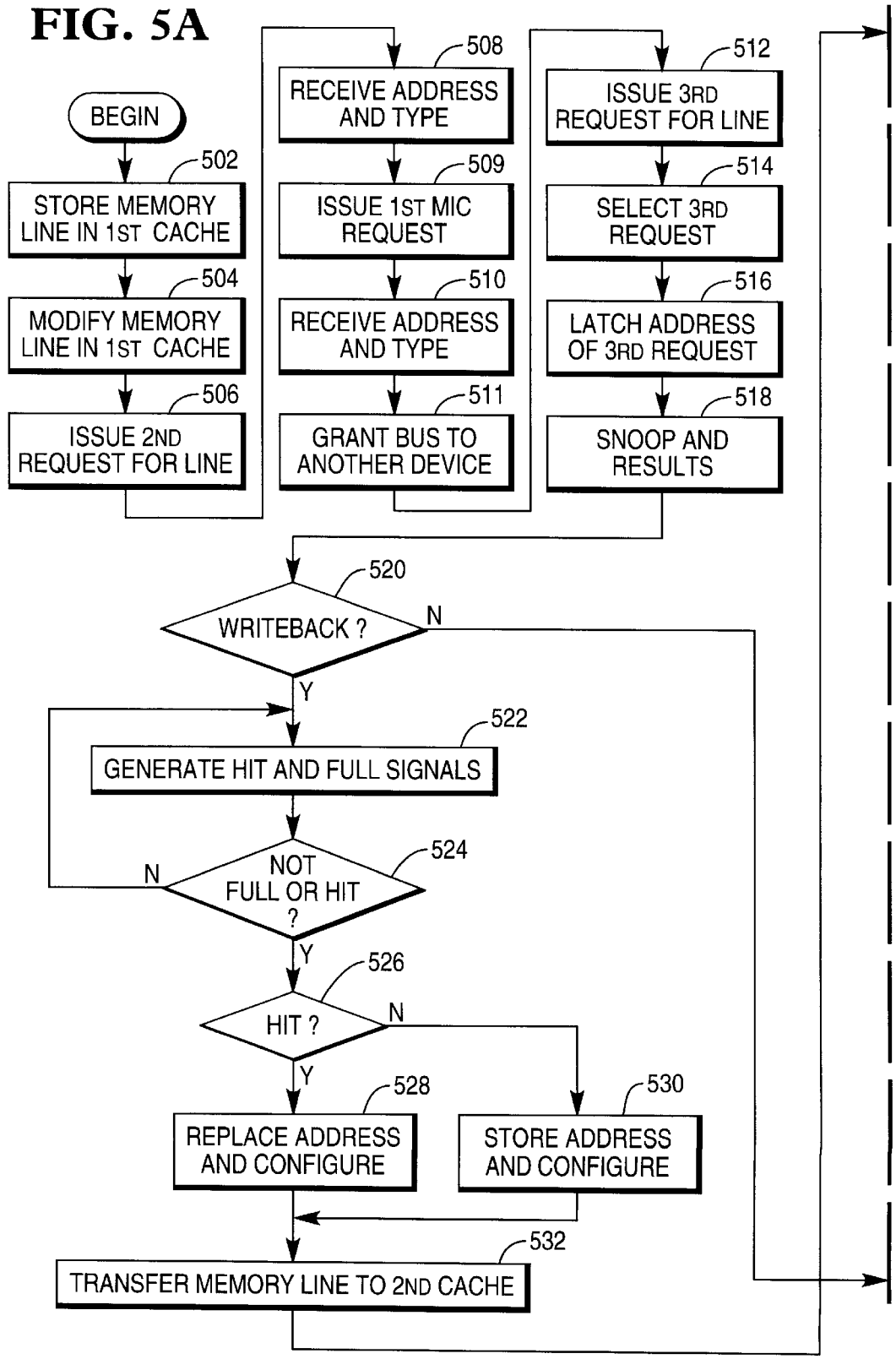

METHOD AND APPARATUS OF RESOLVING A DEADLOCK BY COLLAPSING WRITEBACKS TO A MEMORY

BACKGROUND OF THE INVENTION

The present invention relates generally to a memory controller, and more particularly to a method and apparatus for resolving a deadlock situation via collapsing of writebacks to a memory.

Cache memories are typically used in computer systems to decrease the memory access time of processors thereof. A cache memory is a relatively small, high speed memory in which previously accessed information (program instructions and/or data) are stored within cache lines of the cache memory. A cache memory is typically faster than main memory by a factor of 5 to 10 and typically approaches the speed of its corresponding processor. By keeping the most frequently accessed data items in the high speed cache memories, the average memory access time of the processors will approach the access time of the cache memories.

In computer systems having multiple processors and cache memories, the gain in performance from improved memory access time is offset somewhat by the added complexity of maintaining cache coherency. Cache coherency is the method of ensuring that all of the processors in a computer system, and their associated cache memories, are using the latest data. This coherency problem specifically occurs when data stored in cache memory is modified. There are two approaches for providing processors of the computer system with modified data stored in the cache memory. The first approach utilizes a write-through cache system. In a write through cache system, modified data is written to and through a first cache memory to the main memory, and any corresponding copy of the modified data that may reside in other cache memories of the computer system is invalidated. Therefore, when processors subsequently attempt to read the modified data, the modified data is supplied from main memory for all processors whose associated cache memory contains no valid copy of the data.

The second approach utilizes a writeback cache system. In a writeback cache system, a processor and associated cache memory must first obtain ownership of a memory location before the processor may modify the memory location in its cache memory. In response to the processor and associated cache memory obtaining ownership of the memory location, the other cache memories invalidate any copy of the memory location which they may contain. After obtaining ownership of the memory location, the processor may write modified data to its associated cache memory without immediately writing the modified data to main memory. Therefore, data in a cache memory may be different than corresponding data in main memory. In order to maintain coherency, the modified data is later written back to the main memory in response to various events. For example, a writeback cache may write the data back to main memory when: a) a first processor requests the use of modified data stored in the associated cache memory of a second processor, b) a cache line having modified data needs to be replaced with a different line from main memory, or c) a periodic flush of cache memory is performed in order to prevent accidental data loss.

A deadlock situation may occur in a multi-processor system that includes a memory controller having two ports for receiving memory requests. For example, the memory controller may decide to process a first memory request that is received via a first bus. The first memory request may require data located in a cache memory that is coupled to the memory controller via a second bus. Therefore, the memory controller may need to propagate the first memory request through to the second bus in order to obtain the data for the first memory request. However, before the memory controller is able to propagate the first memory request through to the second bus, another device may have already issued a second memory request on the second bus. The memory controller may decide that in order to process the second memory request, the second memory request needs to be propagated through to the first bus. If the memory controller cannot delay processing of either the first memory request or the second memory request, then a deadlock situation will occur because the first memory request is blocking the completion of the second memory request on the first bus and the second memory request is blocking the completion of the first memory request on the second bus.

What is needed therefore is a method and apparatus which resolves the above deadlock situations in a dual ported memory controller.

SUMMARY OF THE INVENTION

In accordance with one embodiment of the present invention, there is provided a method used by a first memory controller to prevent deadlock of requests to a memory having a first memory line. The method includes the steps of (1) receiving a first memory request for the first memory line from a first bus, (2) receiving a second memory request for the first memory line from a second bus, (3) propagating the first memory request through to the second bus after the second memory request receiving step, (4) processing the second memory request by storing a first modified copy of the first memory line in the first memory controller, and (5) processing the first memory request by (a) storing a second modified copy of the first memory line in the first memory controller, and (b) transferring the second modified copy of the first memory line to a caching agent in order to satisfy the first memory request.

It is an object of the present invention to provide an improved method and apparatus for processing memory requests.

It is an object of the present invention to provide a new and useful method and apparatus for processing memory requests.

It is a further object of the present invention to provide a method and apparatus which reduces traffic across a memory bus.

It is yet a further object of the present invention to provide a method and apparatus which increases the performance of a computer system by reducing the number of writes to main memory.

It is yet a further object of the present invention to provide a method and apparatus which reduces the number of writes to main memory while maintaining coherency amongst multiple cache memories and main memory.

Yet another object of the present invention is to provide a method and apparatus which collapses multiple cache memory writebacks into a single write to main memory.

It is yet a further object of the present invention to provide a method and apparatus which prevents a deadlock of memory requests.

The above and other objects, features, and advantages of the present invention will become apparent from the following description and the attached drawings.

BRIEF DESCRIPTION OF THE DRAWINGS

FIGS. 5A and 5B shows a flowchart of a second series of exemplary memory requests that illustrates how the writeback collapsing method of FIG. 3 may resolve a deadlock situation.

DETAILED DESCRIPTION OF A PREFERRED EMBODIMENT

Figure 1A:
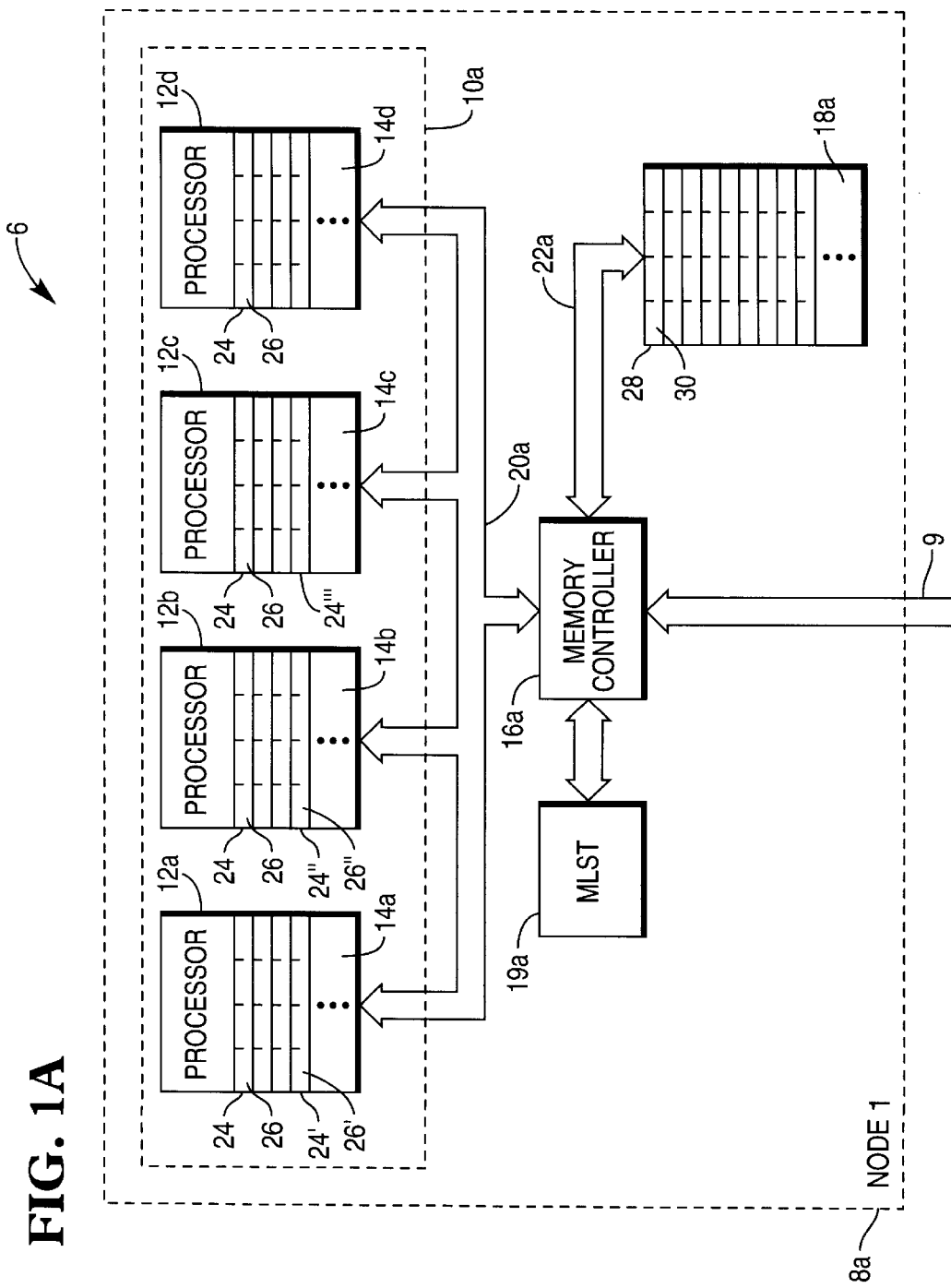
FIGS. 1A and 1B shows a simplified block diagram of an exemplary computer system incorporating features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1B:
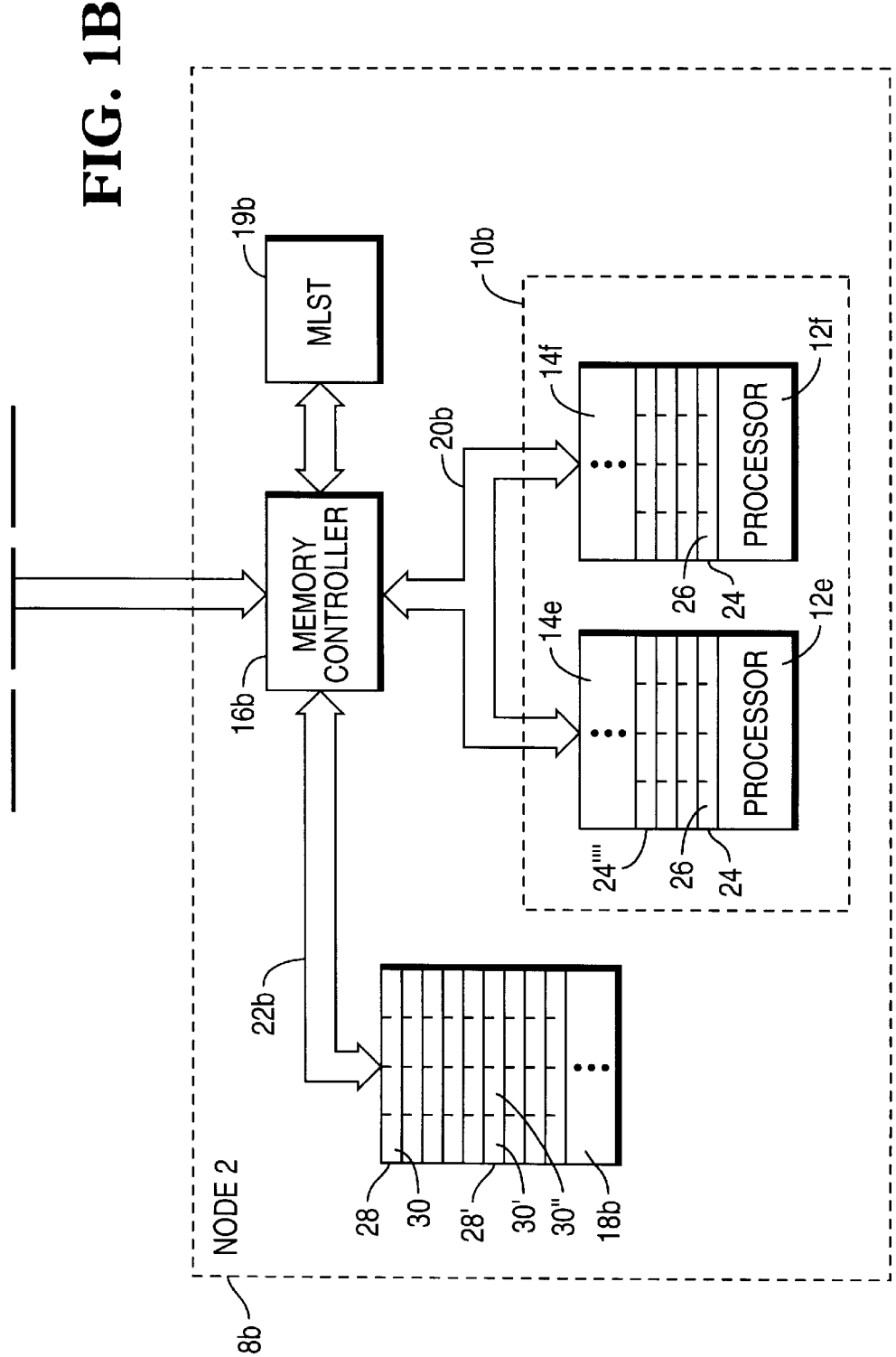

A simplified block diagram of an exemplary computer system 6 which incorporates features of the present invention therein is shown in FIG. 1. The computers system 6 includes a first node 8a, a second node 8b, and an interconnection bus 9 that couples the first node 8a to the second node 8b. The first node 8a includes a first group of caching agents 10a, a first memory controller 16a, a first memory 18a, a first memory line status table (MLST) 19a, a first processor bus 20a, and a first memory bus 22a. The first group of caching agents 10a is operatively coupled to the first memory controller 16a by the first processor bus 20a, and the first memory 18a is operatively coupled to the first memory controller 16a by the first memory bus 22a. Furthermore, the first memory controller 16a is operatively coupled to the second node 8b by the interconnection bus 9 and is further operatively coupled to the first MLST 19a.

The second node 8b includes a second group of caching agents 10b, a second memory controller 16b, a first memory 18b, a second MLST 19b, a second processor bus 20b, and a second memory bus 22a. The second group of caching agents 10b is operatively coupled to the second memory controller 16b by the second processor bus 20b, and the second memory 18b is operatively coupled to the second memory controller 16b by the second memory bus 22b. Furthermore, the second memory controller 16b is operatively coupled to the first node 8a by the interconnection bus 9 and is further operatively coupled to the second MLST 19b.

For purposes of clarity, a component is local to another component if both components are in the first node 8a or if both components are in the second node 8b. On the other hand, a component is remote to another component if one component is in the first node 8a and the other component is in the second node 8b. In other words, components of the same node are local to one another and components of different nodes are remote to one another.

The first group of caching agents 10a includes four processors 12a–12d that are each coupled to a corresponding cache memory 14a–14d. Similarly the second group of caching agents includes two processors 12e–12f that are each coupled to a corresponding cache memory 14e–14f. The processors 12a–12f, which are the computational and control components of the computer system 6, fetch, interpret, and execute instructions stored in the first memory 18a and the second memory 18b. The processors 12a–12f also send and receive information over the processor buses 20a and 20b to and from other devices within the computer system 6. In a preferred embodiment the processors 12a–12f are Pentium Pro™ processors which are commercially available form Intel Corporation of Santa Cruz, Calif.

The cache memories 14a–14f are implemented with a small amount of very fast memory such as static random access memory (SRAM). The cache memories 14a–14f include several cache lines 24 for storing frequently accessed information (i.e. instructions and/or data). Each cache line 24 includes several words 26 that may each store several bytes of information. For example, each cache line 24 in the preferred embodiment includes four words 26 of sixty-four bits or eight bytes each. Furthermore, the cache memories 14a–14f are implemented as writeback cache memories. In other words, information to be written to the first memory 18a or the second memory 18b is first stored in the cache memories 14a–14f and is later transferred in response to various conditions to the first memory controller 16a or the second memory controller 16b for writing to first memory 18a and the second memory 18b. In a preferred embodiment, the cache memories 14a–14f have a capacity to store one Megabyte of information and are implemented as the internal cache memory of the processors 12a–12f; however, it should be appreciated that the cache memories 14a–14f may be implemented as (1) external cache memory, (2) internal cache memory, (3) internal and external cache memory, or (4) several levels of cache memory.

The first memory 18a and the second memory 18b store information (data and instructions). The first memory 18a and the second memory 18b generally consists of several Megabytes of storage and are typically implemented with dynamic random access memory (DRAM). While DRAM is slower than SRAM, DRAM is also much cheaper. The first memory 18a and the second memory 18b each include several memory lines 28 which include several addressable storage locations or memory locations 30. In the preferred embodiment, each memory line 28 holds the same amount of information as each cache line 24 and transfers of information between the cache memories 14a–14f and the first memory 18a and the second memory 18b typically occur a memory line at a time.

Most computer systems are designed for byte addressability and the computer system 6 is no exception. In other words, each addressable memory location 30 holds one byte of information and the processors 12a–12f may modify a single memory location 30 by modifying a single byte of a cache line 24. However, in order to simplify the description of the present invention and FIG. 1, each addressable memory location 30 is assumed to be the same size as the cache line words 26. In other words, each addressable memory location 30 in the following description may store eight bytes of information.

The advantage of a memory system which uses a hierarchy of faster cache memories 14a–14f with slower first memory 18a and second memory 18b is that the memory system is both economical and efficient in processing memory requests. This advantage is a direct result of the spatial and temporal locality of reference principles. The spatial locality of reference principle contends that a small percentage of the first memory 18a and the second memory 18b is used a large percentage of the time. The temporal locality of reference principle contends that a memory location once referenced is likely to be referenced again within a short period of time. If these parts of the first memory 18a and the second memory 18b (or large part thereof) are stored in cache memories 14a–14f, a large percentage of memory operations such as reads and writes may be performed directly to and from these faster cache memories 14a–14d.

For example, when a processor 12a–12f requests information from a memory location 30 of the first memory 18a or the second memory 18b, the processor 12a–12f checks to see if a valid copy of the memory location 30 is already in its corresponding cache memory 14a–14f. If a valid copy of the memory location 30 is already in its corresponding cache memory 14a–14f, the processor 12a–12f may acquire the information from the corresponding cache memory 14a–14f at a rate that is many times faster than the same acquisition from either the first memory 18a or the second memory 18b.

Ideally, the speed of the cache memories 14a–14f is equal to the speed of the processors 12a–12f in order to minimize the amount of time the processors 12a–12f wait on memory operations. Hence, the cache memories 14a–14f may effectively decrease the average latency of memory operations by speeding up a large percentage of memory operations. However, since both the cost of the memory system and the number of memory operations that may be performed directly to and from the cache memories 14a–14f increases as the capacity of the cache memories 14a–14f increases, the storage capacity of the cache memories 14a–14f is a compromise between performance of the memory system and cost of the memory system.

The interconnection bus 9 is a set of conductor lines that transmits information between the first memory controller 16a and the second memory controller 16b. Likewise, the first processor bus 20a is a set of conductor lines that transmits information between the first memory controller 16a and the first group of caching agents 10a, and the second processor bus 20b is a set of conductor lines that transmits information between the second memory controller 16b and the second group of caching agents 10b. In the preferred embodiment, the interconnection bus 9, the first processor bus 20a, and the second processor bus 20b are each pipelined split transaction buses (e.g. a Pentium Pro™ processor bus) in which memory operations are split into several phases such as an arbitration phase, a request phase, a snoop phase, a response phase, and a data phase, and in which several memory operations at different phases may be concurrently taking place.

The interconnection bus 9, the first processor bus 20a, and the second processor bus 20b in the preferred embodiment perform similarly. Therefore, in order to simplify the following description of the various bus phases, only the operation of the first processor bus 20a will be described. One of the first bus phases of a typical memory operation is the arbitration phase. During the arbitration phase, the processors 12a–12d of the first group of caching agents 10a and the first memory controller 16a arbitrate for access to the first processor bus 20a. The winner of this arbitration phase is granted the right to issue a memory request during the following request phase.

After the arbitration phase comes the request phase. In the request phase, a processor 12a–12d of the first group of caching agents 10a or the first memory controller 16a issues on the first processor bus 20a a memory request (e.g. a read request, or a write request) that targets a memory location 30. Generally, the memory request includes an address and a request type. The address indicates which memory location 30 the memory request is targeting, and the request type indicates the type of memory request (e.g. read, read for ownership, or write)

The snoop phase follows the request phase. During the snoop phase, each processor 12a–12d of the first group of caching agents 10a determines whether its corresponding cache memory 14a–14d has a valid copy of the targeted memory location 30 and whether the processor 12a–12d must take some action in response to the memory request (e.g. invalidate cache lines 24, and/or transfer information stored in cache lines 24). The processors 12a–12d of the first group of caching agents 10a make this determination by comparing the address issued during the request phase to addresses of the memory line copies stored in their corresponding cache memories 14a–14d.

The response phase follows the snoop phase. During the response phase, a response to the memory request is issued from either the first memory controller 16a or one of the processors 12a–12d of the first group of caching agents 10a. The response indicates how the memory request will be handled. For example, the first memory controller 16a may indicate that the memory request is to be deferred, retried, stalled, or satisfied. If the memory request is to be deferred, the requested information will be supplied at some future time, thus freeing the first processor bus 20a for other memory requests. If the memory request is to be retried, the requesting processor 12a–12d is forced to re-issue the memory request. If the memory request is to be stalled, the memory request is temporarily stopped thereby delaying the data phase until the memory request can be satisfied. If the memory request is to be satisfied, the memory request continues to the data phase where information will be transferred in response to the memory request.

The data phase follows the response phase. During the data phase, information is transferred across the first processor bus 20a to fulfill the memory request. Depending upon the type of request and the contents of the cache memories 14a–14d of the first group of caching agents 10a, this transfer of information may be somewhat complicated due to the requirement that the cache memories 14a–14d remain coherent with the first memory 18a, the second memory 18b, and the cache memories 14e–14f of the second group of caching agents 10b.

Coherency methods or cache coherency methods refer to the methods that the computer system 6 utilizes to ensure that when a processor 12a–12f requests information from a memory location 30, the requesting processor 12a–12f receives a valid copy of the information (the latest, most up-to-date copy of the information). Since each of the cache memories 14a–14f stores copies of memory lines 28, the computer system 6 must implement coherency methods to make sure that whenever a processor 12a–12f requests information from the first memory 18a or the second memory 18b, the requesting processor 12a–12f receives a valid copy of the requested information no matter where that valid copy resides (i.e. the cache memories 14a–14f, the first memory controller 16a, the second memory controller 16b, the first memory 18a, or the second memory 18b)

The computer system 6 maintains coherency via (a) coherency rules, (b) the first MLST 19a, (c) the second MLST 19b, (d) the various phases of the interconnection bus 9, the first processor bus 20a, the second processor bus 20b, and (e) memory intervention cycle (MIC) requests. MIC requests are essentially read or read invalidate requests that are issued by the first memory controller 16a and the second memory controller 16b in order to maintain coherency between the first node 8a and the second node 8b.

One coherency rule of the preferred embodiment is that each cache line 24 and corresponding memory line 28 stored therein is marked as being in one of four states: a "modified" state, an "exclusive" state, a "shared" state, or an "invalid" state. A cache line 24 is marked as being in the invalid state if the cache line 24 does not contain a valid copy of a memory line 28 or has been requested to invalidate its copy of a memory line 28. A cache line 24 is marked as being in the shared state if the cache line 24 of a cache memory 14a–14d has a valid, unmodified copy of a memory line 28 and another cache line 24 of another cache memory 14a–14d may also have a valid, unmodified copy of the same memory line 28. A cache line 24 is marked as being in the exclusive state if the cache line 24 has a valid, unmodified copy of a memory line 28 and no other cache line 24 may have a valid, unmodified copy of the same memory line 28. Finally, a cache line 24 is marked as being in the modified state if the cache line 24 has a modified copy of a memory line 28 that has not been written back to the main memory 18.

Another coherency rule of the preferred embodiment is that a processor 12a–12f may only modify a memory line 28 stored in a cache line 24 if the cache line 24 was in a modified state or an exclusive state prior to the modification. In the preferred embodiment, a processor 12a–12f may place a cache line 24 into the exclusive state by issuing a "read for ownership" request or a "read and invalidate" request upon its respective processor bus 20a or 20b. The "read for ownership" request causes a valid copy of the requested memory line 28 to be placed into a cache line 24 of the cache memory 14a–14f that corresponds to the requesting processor 12a–12f and causes the cache memories 14a–14f that do not correspond to the requesting processor 12a–12f to invalidate any copy of the requested memory line 28 that may reside in these non-corresponding cache memories 14a–14f.

Furthermore, another coherency rule of the preferred embodiment is that the processors 12a–12f and corresponding cache memories 14a–14f are forced to writeback any modified memory line 28 to the first memory 18a or the second memory 18b when the modified memory line 28 is replaced or invalidated in the cache memories 14a–14f. Yet another coherency rule of the preferred embodiment is that (a) MIC requests and (b) memory requests that generate writebacks from the cache memories 14a–14f to their respective local memory controller 16a or 16b may not be deferred or retried, but may be stalled. The above combination of coherency rules ensures that a modified copy of a memory line 28 is easily tracked and that only one of the cache memories 14a–14f may contain a modified copy of a memory line 28, thus simplifying the determination of where valid data exists in the computer system 6.

One consequence of the above coherency rules is that a memory line such as memory line 28' that has been modified in a cache line such as cache line 24' is written back to the first memory 18a in response to a read or read invalidate type of request that targets a first memory line 28' if the memory request is issued from a non-corresponding processor such as processors 12b–12d. A writeback in response to a read or read invalidate type of request is referred to as an implicit writeback. An implicit writeback is different than a normal writeback in that activities other than corresponding processor activities cause the writeback. In a normal writeback, a processor 12a–12f may force its corresponding cache memory 14a–14f to writeback a modified memory line. Typically a processor 12a–12f does a normal writeback in response to two situations: (a) a modified memory line 28 is replaced with another memory line 28; or (b) the cache memory 14a–14f has reached some triggering condition such as a time interval has expired or a certain percentage of the cache memory 14a–14f contains modified memory lines 28.

While the above coherency rules and the various bus phases of the first processor bus 20a, and the second processor bus 20b maintain coherency within a single node 8a or 8b, the first MLST 19a, the second MLST 19b, and the MIC requests provide a mechanism for maintaining coherency across the first node 8a and the second node 8b. The first MLST 19a and the second MLST 19b are each implemented in SRAM in the preferred embodiment. The first MLST 19a contains status information about each cached memory line of the first memory 18a (i.e. each memory line 28 of the first memory 18a that is stored in the cache memories 14a–14f). Likewise, the second MLST 19b contains status information about each cached memory line of the second memory 18b. The first memory controller 16a utilizes the information stored in the first MLST 19a to determine whether a memory request on the first processor bus 20a requires a MIC request be issued to the second memory controller 16b via the interconnection bus 9. Likewise, the second memory controller 16b utilizes the information stored in the second MLST 19b to determine whether a memory request on the second processor bus 20b requires a MIC request be issued to the first memory controller 16a via the interconnection bus 9.

In the preferred embodiment, each cached memory line 28 is marked in either the first MLST 19a or the second MLST 19b as being in an "owned local" state, "owned remote" state, a "shared local" state, or a "shared both" state. In particular, a memory line 28 may be marked in the first MLST 19a as (a) "owned local" if a single cache memory 14a–14d of the first group of caching agents 10a may contain a copy of the memory line 28 in the modified state or the exclusive state, (b) "owned remote" if a single cache memory 14e–14f of the second group of caching agents 10b may contain a copy of the memory line 28 in the modified state or the exclusive state, (c) "shared local" if one or more cache memories 14a–14d of the first group of caching agents 10a may contain a copy of the memory line 28 in the shared state or the invalid state, or (d) "shared both" if cache memories 14a–14f of both the first group of caching agents 10a and the second group of caching agents 10b may contain a copy of the memory line 28 in the shared state or the invalid state.

Likewise, a memory line 28 may be marked in the second MLST 19b as (a) "owned local" if a single cache memory 14e–14f of the second group of a caching agents 10b may contain a copy of the memory line 28 in the modified state or the exclusive state, (b) "owned remote" if a single cache memory 14a–14d of the first group of caching agents 10a may contain a copy of the memory line 28 in the modified state or the exclusive state, (c) "shared local" if one or more cache memories 14e–14f of the second group of caching agents 10b may contain a copy of the memory line 28 in the shared state or the invalid state, or (d) "shared both" if cache memories 14a–14f of both the first group of caching agents 10a and the second group of caching agents may contain a copy of the memory line 28 in the shared state or the invalid state.

In addition to the above states, the first memory controller 16a and the second memory controller 16b mark each memory line 28 that is targeted by a pending MIC request as being in a transient state. The transient state essentially means that a MIC request for the marked memory line 28 has been generated but has yet to complete. The first memory controller 16a and the second memory controller 16b use this transient state information to help simplify their respective coherency logic. In particular, the first memory controller 16a and the second memory controller 16b, if possible, retry any subsequent memory request that targets a memory line 28 that is marked in the transient state. By doing so, the first memory controller 16a and the second memory controller 16b ensure that any subsequent memory request to the marked memory line 28 will complete after the pending MIC request to the marked memory line 28, thus maintaining coherency. However, it should be appreciated from the above coherency rules, that the first memory controller 16a and the second memory controller 16b may not retry or defer (a) MIC requests, or (b) memory requests that generate writebacks. As a result, the first memory controller 16a and the second memory controller 16b include additional coherency logic to deal with these requests. In particular the first memory controller 16a and the second memory controller 16b include writeback collapsing circuitry in order to process requests that may not be deferred or retried but target memory lines marked in the transient state.

The first memory controller 16a receives and processes memory requests from the first processor bus 20a and the interconnection bus 9 and generally ensures that the memory request obtains the latest copy of the targeted memory line 28. To ensure that the memory requests obtain the latest copy of the targeted memory line 28, the first memory controller 16a may need to (a) obtain a copy of the targeted memory line 28 from the first memory 18a, (b) obtain a copy of the targeted memory line 28 from its writeback collapsing circuitry, (c) allow a processor 12a–12d of the first group of caching agents 10a to deliver a copy of the targeted memory line from its corresponding cache memory 14a–14d, and/or (d) issue a MIC request to the second memory controller 16b via the interconnection bus 9 in order to (i) obtain a copy of the targeted memory line 28 from a cache memory 14e–14f of the second group of caching agents 10b, (ii) invalidate copies of the targeted memory line 28 stored in cache memories 14e–14f of the second group of caching agents 10b, (iii) update the second MLST 19b, and/or (iv) obtain the targeted memory line 28 from the second memory 18b.

The second memory controller 16b receives and processes memory requests from the second processor bus 20b and the interconnection bus 9 and generally ensures that the memory requests obtain the latest copy of the targeted memory line 28. To ensure that the memory request obtains the latest copy of the targeted memory line 28, the second memory controller 16b may need to (a) obtain a copy of the targeted memory line 28 from the second memory 18b, (b) obtain a copy of the targeted memory line 28 from its writeback collapsing circuitry, (c) allow a processor 12e–12f of the second group of caching agents 10b to deliver a copy of the targeted memory line from its corresponding cache memory 14e–14f, and/or (d) issue a MIC request to the first memory controller 16a via the interconnection bus 9 in order to (i) obtain a copy of the targeted memory line 28 from a cache memory 14a–14d of the first group of caching agents 10a, (ii) invalidate copies of the targeted memory line 28 stored in cache memories 14a–14d of the first group of caching agents 10a, (iii) update the first MLST 19a, and/or (iv) obtain the targeted memory line 28 from the first memory 18a.

Upon deciding to process a memory request, the first memory controller 16a checks and updates the information stored in the first MLST 19a in order to determine whether a MIC request is required for the selected request. Likewise, upon deciding to process a memory request, the second memory controller 16b checks and updates the information stored in the second MLST 19b in order to determine whether a MIC request is required for the selected request. For example, if the second memory controller 16b receives a read for ownership request for the memory line 28' from processor 14e of the second group of caching agents 10b and the second MLST 19b indicates that the memory line 28' is "owned remote," then the second memory controller 16b must issue a MIC request upon the interconnection bus 9 in order to obtain the latest copy of the memory line 28' and to invalidate any copy of the memory line 28' that is stored in cache memories 14a–14d of the first group of caching agents 10a.

Figure 2:
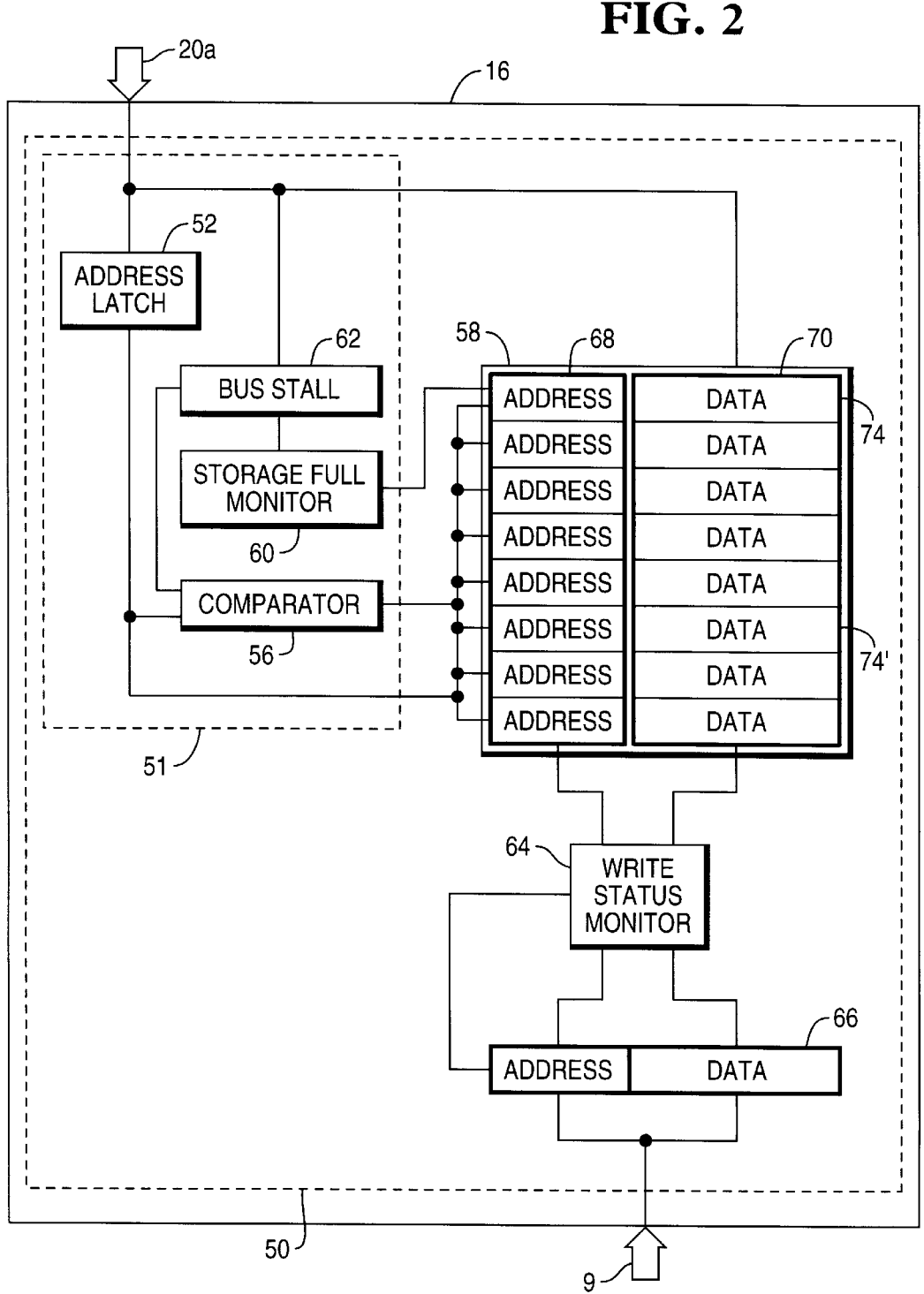
FIG. 2 shows a simplified block diagram of the memory controller of FIG. 1.

Furthermore, the first memory controller 16a includes writeback collapsing circuitry which reduces the number of transfers across the interconnection bus 9 by collapsing multiple writes from the first caching agents 10a to the second memory 18b into a single write. Likewise, the second memory controller 16b includes writeback circuitry which reduces the number of transfers across the interconnection bus 9 by collapsing multiple writes from the second caching agents 10b to the first memory 18a into a single write. Since the writeback circuitry of the first memory controller 16a and the second memory controller 16b function similarly in the preferred embodiment, only the writeback circuitry of the first memory controller 16a will be described in detail. As shown in FIG. 2, the writeback collapsing circuitry 50 of the first memory controller 16a includes a collapsing controller 51, a writeback storage 58, a write status monitor 64, and an output latch 66.

The collapsing controller 51 is coupled to the first processor bus 20a and to the writeback storage 58. The writes status monitor 64 is coupled to the writeback storage 58 and is further coupled to the output latch 66 which is in turn coupled to the first memory bus 22a. The collapsing controller 51 controls the collapsing of writebacks on the first processor bus 20a. The collapsing controller 51 includes an address latch 52, a comparator 56, a storage full monitor 60, and a bus stall controller 62.

The address latch 52 is configured to latch the address of a memory request on the first processor bus 20a during the request phase of the memory request. The purpose of the address latch 52 is to latch the address of a writeback, to hold the address while the comparator 56 compares the latched address to addresses in the writeback storage 58, and, when appropriate, to pass the writeback address on to the writeback storage 58. Since in the preferred embodiment the first processor bus 20a is a pipe-lined bus, multiple memory requests may be pending on the first processor bus 20a at any given time. As a result, the address latch 52 in the preferred embodiment contains several storage locations for storing addresses of multiple pending memory requests.

The comparator 56, when an address is latched by the address latch 52, compares the latched address to the addresses stored in the writeback storage 58. The purpose of the comparator 56 is to generate a hit signal when the latched address corresponds to, maps to, or targets a memory line 28 that is already targeted by a pending writeback in the writeback storage 58. If the hit signal is generated and the present memory request generates a writeback, the generated writeback can be collapsed with a pending writeback stored in the writeback storage 58.

The writeback storage 58 includes an address store 68 and a data store 70. Both the address store 68 and the data store 70 in combination form several storage elements 74 for storing writebacks or writeback requests. In other words, each storage element 74 includes an address portion and a data portion. The writeback storage 58 further has an output whereby the contents of the writeback storage 58 can be transmitted to the output latch 66 via the write status monitor 64. The writeback storage 58 in the preferred embodiment has eight storage elements 74; however, it should be appreciated that certain advantages of the present invention may be obtained from a writeback storage 58 that contains a different number of storage elements 74. Furthermore, the writeback storage 58 in the preferred embodiment has a buffer structure wherein writebacks are buffered and can be serviced in any order.

The storage full monitor 60 generates a full signal when the writeback storage 58 is full (i.e. has no storage elements 74 that are empty or available). A storage element 74 is considered available when it no longer stores a pending writeback. The bus stall controller 62 stalls the first processor bus 20*a* to ensure that a writeback is not lost due to lack of storage in the first memory controller 16*a*. In one embodiment of the present invention, the bus stall controller 62 stalls the first processor bus 20*a* when the storage full monitor 60 generates the full signal and the comparator 56 does not generate the hit signal.

The write status monitor 64 monitors pending MIC requests and prevents data stored in the writeback storage 58 from being transferred to the second memory controller 16*b* if the writeback data targets a memory line 28 that is targeted by a pending MIC request. Once the first memory controller 16*a* resolves the data phase of the pending MIC request, the write status monitor 64 allows data stored in the writeback storage 58 to be transferred to the second memory controller 16*b* in order to fulfill the MIC request and to update the second memory 18*b*. This prevention of data transfer until the MIC request is resolved, ensures that the latest copy of the targeted memory line 28 is written back to the second memory 18*b*. Once the data phase of the MIC request resolves, the write status monitor 64 may latch the address and data of a pending writeback for the memory request into the output latch 66. The output latch 66, then, holds the address and data being written to the second memory 18*b* until the transfer across the interconnection bus 9 to the second memory controller 16*b* is completed.

Figure 3:
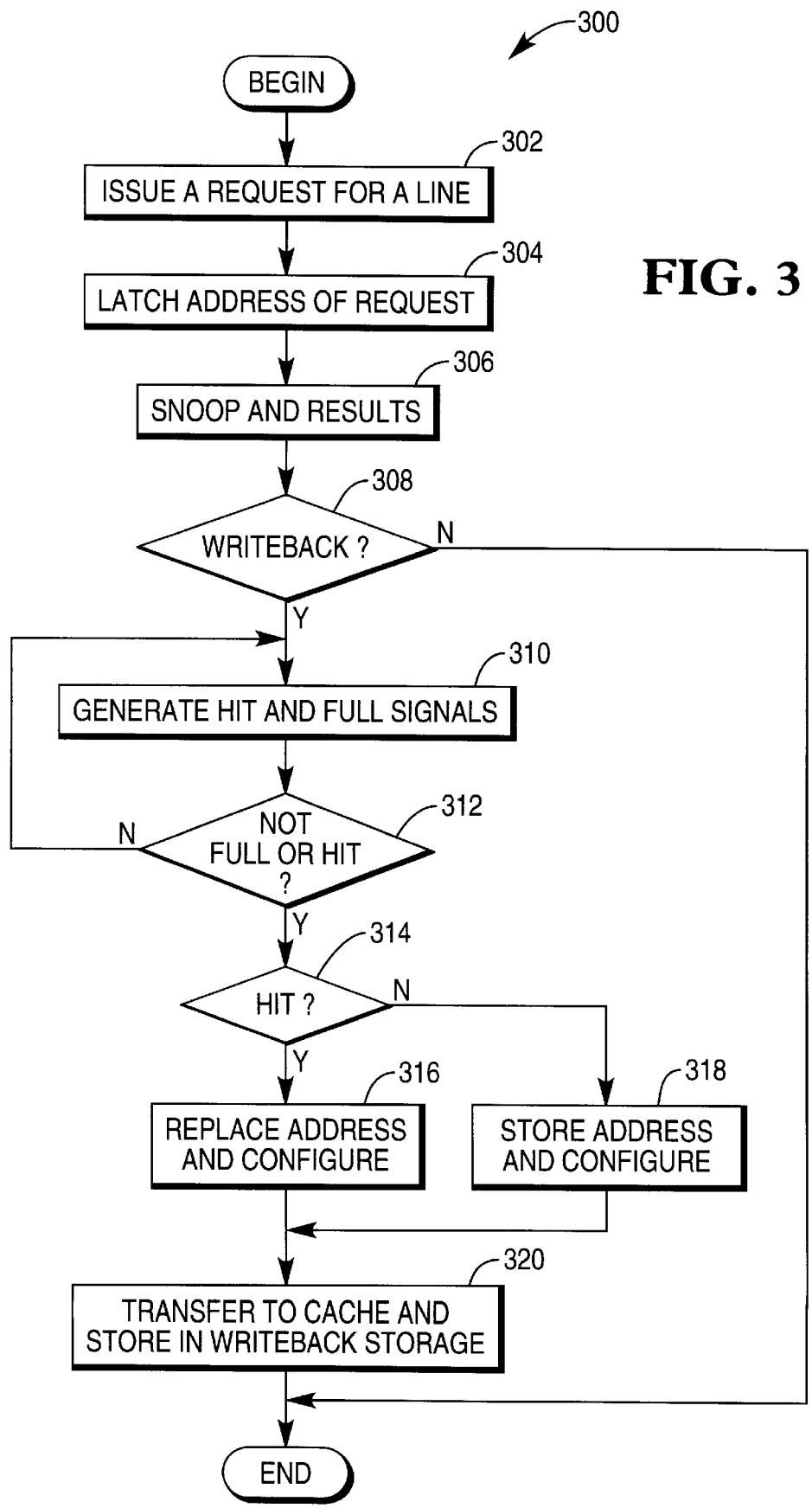
FIG. 3 shows a flowchart of writeback collapsing method which is utilized by the computer system of FIG. 1.

Referring now to FIG. 3, there is shown a writeback collapsing method 300. In order to simplify the description, the writeback collapsing method 300 will be described as applied to only the first processor bus 20*a*. The writeback collapsing method 300 begins in step 302 with a processor 12*a*–12*d* of the first group of caching agents 10*a* issuing a memory request that targets a memory line 28. In particular, a processor 12*a*–12*d* of the first group of caching agents 10*a* during the request phase of the first processor bus 20*a* places a first address upon the first processor bus 20*a* which maps to one of the memory lines 28. Also, during the request phase, the processor 12*a*–12*d* places a request type on the first processor bus 20*a* that indicates the type of memory request that the processor 12*a*–12*d* desires to perform. In response to the processor 12*a*–12*d* issuing the request upon the first processor bus 20*a*, the address latch 52 of the first memory controller 16*a* latches the first address of the request (step 304).

During the snoop phase of step 306, the non-requesting processors 12*a*–12*d* of the first group of caching agents each determine from the address of the request and information stored in its corresponding cache memory 14*a*–14*d* whether the non-requesting processor 12*a*–12*d* must take some action in response to the memory request (e.g. invalidate a cache line 24 or supply a modified memory line 28). Furthermore, each non-requesting processor 12*a*–12*d* generates a separate snoop result upon the first processor bus 20*a* that is indicative of the status of the targeted memory line 28 in its corresponding cache memory 14*a*–14*d*.

In step 308, the first memory controller 16*a* determines from the snoop results generated during the snoop phase and the request type of the present request whether the present request will generate a writeback. If the memory controller 16 determines that no writeback will be generated, then computer system 6 ends its attempt of collapsing a writeback of the present memory request with another writeback. However, if the first memory controller 16*a* determines that a writeback will be generated, then the computer system 6 continues to step 310.

In step 310, the comparator 56 of the first memory controller 16*a* compares the latched address with addresses of other writebacks which are stored in the writeback storage 58. If the address maps to the same memory line 28 as another address of the writeback storage 58, then the comparator 56 generates a hit signal. Furthermore, in step 310, if the writeback storage 58 is full, the storage full monitor 60 generates a full signal.

In step 312, the bus stall controller 62 determines whether the full signal and the hit signal were generated in step 310. If in step 310 the full signal was not generated or the hit signal was generated, the computer system 6 proceeds to step 314. However, if in step 310 the full signal was generated and the hit signal was not generated, then the bus stall controller 62 stalls the first processor bus 20*a* and the computer system 6 returns to step 310. In essence, if in step 310 the full signal was generated and the hit signal was not generated, the bus stall controller 62 stalls the first processor bus 20*a* until a storage element 74 of the writeback storage 58 becomes available. However, if in step 310 the full signal was not generated or the hit signal was generated, then the bus stall controller 62 need not stall the first processor bus 20*a* because the first memory controller 16*a* has sufficient storage space to process a writeback regardless of whether the writeback may be collapsed with another writeback.

In step 314, the first memory controller 16*a* determines whether the hit signal was generated in step 310. If the hit signal was generated in step 310, then the computer system 6 proceeds to step 316 where the writeback storage 58 is configured to collapse a writeback with another writeback. However, if the hit signal was not generated in step 310, the computer system 6 proceeds to step 318 where the writeback storage 58 is configured to store a writeback in an empty storage element 74 of the writeback storage 58.

For step 316, the latched address is written over another address in the address store 68 that corresponds to another writeback stored in the writeback storage 58. Furthermore, the corresponding location in the data store 70 is configured to store the modified memory line 28 during the data phase of the request issued in step 302. For step 318, the latched address is stored in an available location in the address store 68 of the writeback storage 58. Furthermore, the corresponding location in the data store 70 is configured to store the modified memory line 28 during the data phase of the request issued in step 302.

After the writeback storage 58 is properly configured, the non-requesting processor 12*a*–12*d* of the first group of caching agents 10*a* which contains the modified copy of the memory line 28 transfers, during the data phase of step 320, the modified memory line 28 from a cache line 24 of its cache memory 14*a*–14*d* to a cache line 24 of the cache memory 14*a*–14*d* of the requesting processor 12*a*–12*d*. The transfer of the modified memory line 28 during the data phase of the first processor bus 20*a* also causes the modified memory line 28 to be stored in the data portion of one of the storage elements 74 since the data store 70 was configured in step 316 or step 318 to receive the modified memory line 28. After step 320, the requesting processor 12a–12d of the first group of caching agents 10a and the writeback storage 58 have valid copies of the requested memory line 28.

Figure 4A:
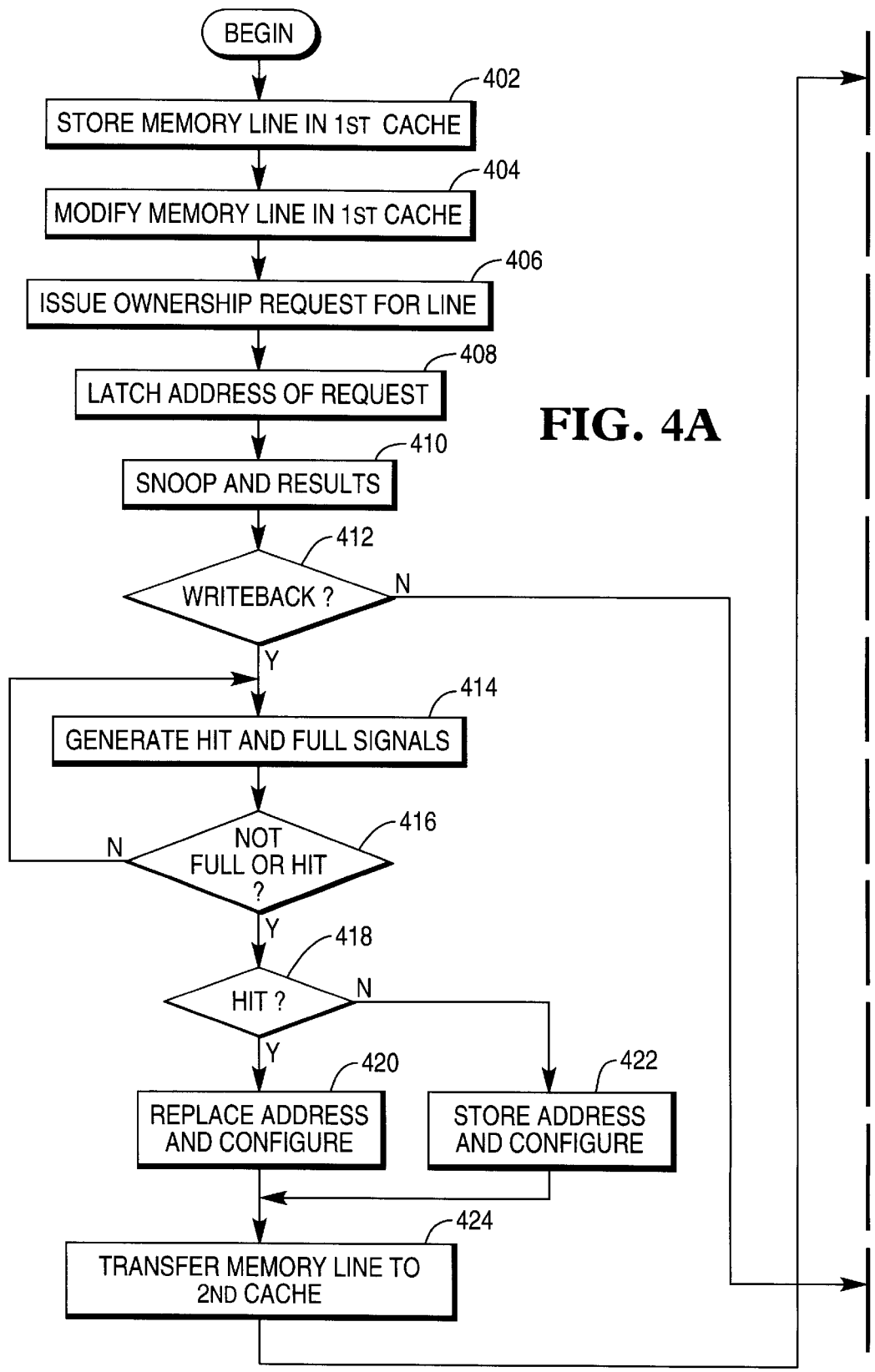
FIGS. 4A and 4B shows a flowchart of a first series of exemplary memory requests that illustrates the writeback collapsing method of FIG. 3.
Figure 4B:
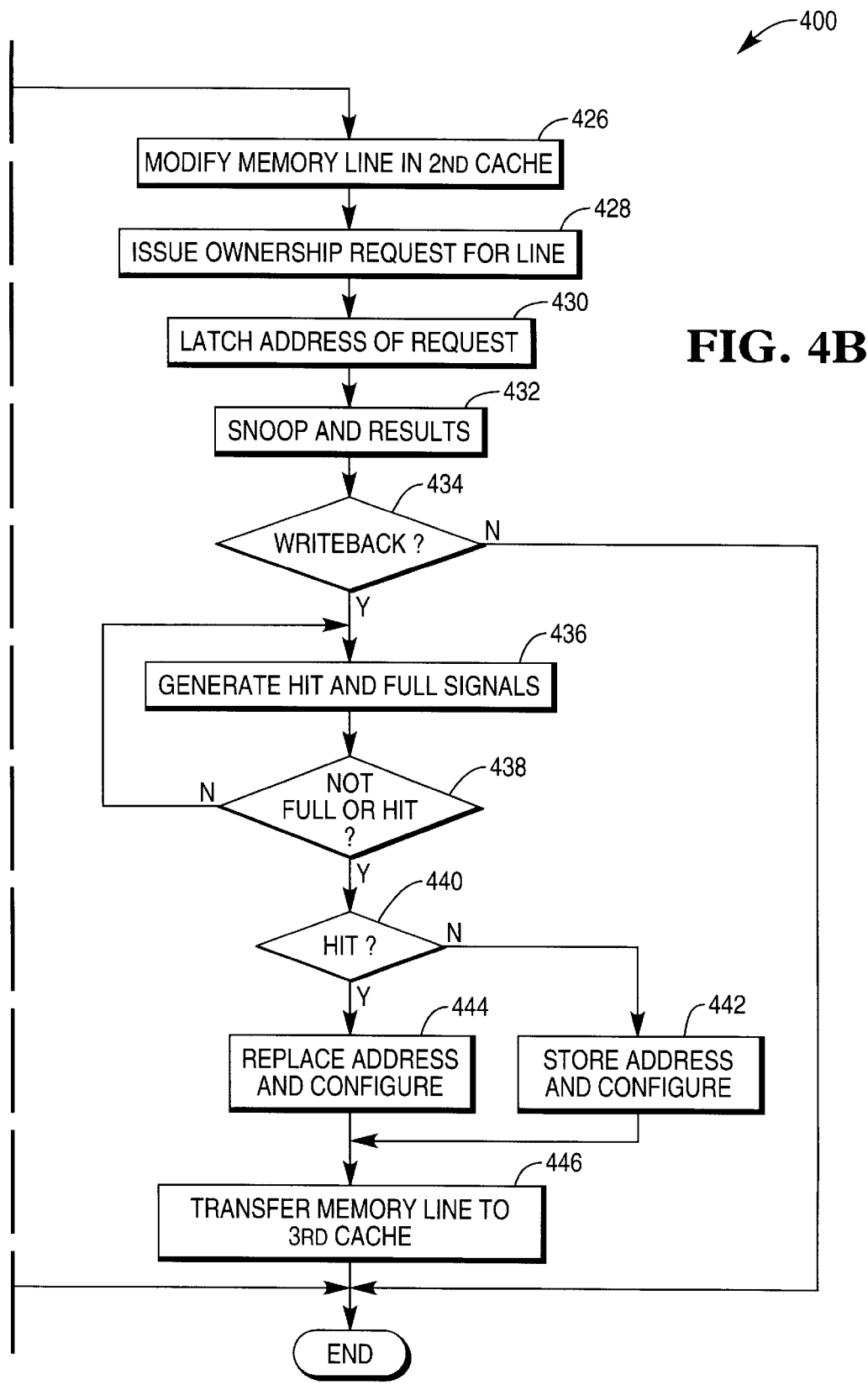

In order to illustrate the writeback collapsing method 300 in greater detail, a flowchart is shown in FIG. 4 of an exemplary series of memory requests 400 that utilize the writeback collapsing method 300. The following description of the exemplary series of memory requests 400 assumes that first data is stored in a first memory location 30' of the second memory 18b and that no writebacks are stored in the writeback storage 58 of the first memory controller 16a.

In step 402, a first processor 12a of the first group of caching agents 10a issues upon the first processor bus 20a a first read for ownership request that targets the first memory location 30'. Assuming that the second memory 18b contains the only valid copy of the first memory location 30', the information stored in a first memory line 28' which includes the first data stored in the first memory location 30' is transferred from the second memory 18b to a first cache line 24' of a first cache memory 14a. The first word 26' of the first cache line 24' now contains a valid copy of the first data stored in the first memory location 30'. Furthermore, the first cache line 24' is marked as being in the exclusive state since the first processor 12a issued a read for ownership request in step 402.

The first processor 12a then in step 404 generates second data for the first memory location 30' by modifying the copy of the first memory location 30' in its corresponding first cache memory 14a (i.e. by writing the second data over the first data stored in first word 26' of first cache line 24'). As a direct result of modifying the copy of the first memory location 30', the copy of the first memory line 28' which is stored in the first cache line 24' is also modified. Therefore, the first cache line 24' is marked as being in the modified state.

In step 406, a second processor 12b of the first group of caching agents 10a desires to modify a second memory location 30" which is also a part of the first memory line 28'. However, due to the coherency rules of the preferred embodiment, the second processor 12b may only modify those memory lines 28 which are stored in its corresponding second cache memory 14b in an exclusive state or a modified state. Therefore, in order to obtain an exclusive state copy of the second memory location 30", the second processor 12b issues upon the first processor bus 20a a second read for ownership request that targets the second memory location 30". In particular, the second processor 12b during the request phase of the first processor bus 20a places a first address upon the first processor bus 20a which maps to the second memory location 30" and therefore also maps to the first memory line 28'. Also, during the request phase, the second processor 12b places a request type on the first processor bus 20a that indicates that the second processor 12b desires to perform a read for ownership request. In response to the second processor 12b issuing the second memory request upon the first processor bus 20a, the address latch 52 of the first memory controller 16a latches the first address of the second memory request (step 408).

During the snoop phase of step 410, each non-requesting processor 12a, 12c, and 12d of the first group of caching agents 10a determines from the first address of the second memory request and information stored in its corresponding cache memory 14a, 14c, or 14d whether it must take some action in response to the second memory request (e.g. invalidate a cache line 24 or supply a modified copy of the first memory line 28'). Furthermore, each non-requesting processor 12a, 12c, and 12d generates a separate snoop result upon the first processor bus 20a that is indicative of the status of the first memory line 28' in its corresponding cache memory 12a, 12c, or 12d.

In step 412, since the first cache memory 14a contains a first modified copy of the first memory line 28', the combination of the request type and the generated snoop results informs the first memory controller 16a that the second memory request will generate a writeback. Therefore, the computer system 6 proceeds to step 414.

In step 414, the comparator 56 of the first memory controller 16a generates a hit signal if the first address indicates that the memory request maps to the same memory line of the second memory 18b as a writeback stored in the writeback storage 58. Furthermore, in step 414, the storage full monitor 60 generates a full signal if the writeback storage is full. Since the present example assumes that no pending writebacks were stored in the writeback storage 58 prior to the first memory request of step 402, the comparator 56 does not generate the hit signal and the storage full monitor 60 does not generate the full signal.

In step 416, the bus stall controller 62 determines that the full signal was not generated in step 414. As a result, the bus stall controller 62 does not stall the first processor bus 20a and the computer system 6 proceeds to step 418. In other words, the first memory controller 16a has sufficient storage space to process a writeback regardless of whether the writeback may be collapsed with another writeback and the bus stall controller 62 has no need to stall the first processor bus 20a.

In step 418, the first memory controller 16a determines that the hit signal was not generated in step 414. As a result, the computer system 6 proceeds to step 422 where the writeback storage 58 is configured to store a writeback in an empty storage element 74' of the writeback storage 58.

The latched first address in step 422 is stored in an empty location in the address store 68 of the writeback storage 58. Furthermore, the corresponding location in the data store 70 is configured to store the first modified copy of the first memory line 28' during the data phase of the second memory request. In particular, the first address is stored in the address portion of a first storage element 74' and the corresponding data portion of the first storage element 74' is configured to store the first modified copy of the memory line 28', during the data phase of the second memory request.

After the writeback storage 58 is properly configured, the first processor 12a during the data phase of step 424 transfers the first modified copy of the first memory line 28' from the first cache line 24' to a second cache line 24" of the second cache memory 14b. The transfer of the first modified copy of the first memory line 28' during the data phase of the first processor bus 20a also causes the first modified copy of the first memory line 28' to be stored in the data portion of the first storage element 74' since the data store 70 was configured in step 422 to receive the first modified copy of the first memory line 28'.

After step 424, the second cache line 24" contains a valid copy of the first memory line 28' and is marked as being in the exclusive state since the second processor 12b issued a read for ownership request in step 406. In particular, a second word 26" of the second cache line 24" contains a copy of the second data for the first memory location 30' and a third word 26''' contains a copy of whatever was stored in the second memory location 30". The second processor 12b then in step 426 generates third data for the second memory location 30" by writing the third data to the third word 26'" of the second cache line 24". As a direct result of writing the third data to the third word 26'", the copy of the first memory line 28' stored in the second cache line 24" is also modified. Therefore, the second cache line 24" is marked as being in the modified state.

In step 428, a third processor 12c of the first group of caching agents 10a desires to obtain data stored in the second memory location 30" which is a part of the first memory line 28'. Therefore, in order to obtain a copy of the first memory line 28' and the second memory location 30", the third processor 12c issues upon the first processor bus 20a a third read request that targets the memory location 30". In particular, the third processor 12c during the request phase of the first processor bus 20a places a second address upon the first processor bus 20a which maps to the second memory location 30" and therefore also maps to the first memory line 28'. Also, during the request phase, the third processor 12c places a request type on the first processor bus 20a that indicates that the third processor 12c desires to perform a read request. In response to the third processor 12c issuing the third memory request upon the first processor bus 20a, the address latch 52 of the first memory controller 16a latches the second address of the third memory request (step 430).

During the snoop phase of step 432, each non-requesting processor 12a, 12b, and 12d of the first group of caching agents 10a determines from the second address of the request and information stored in its corresponding cache memory 14a, 14b, or 14d whether it must take some action in response to the memory request (e.g. invalidate a cache line 24 or supply a modified copy of the first memory line 28'). Furthermore, each non-requesting processor 12a, 12b, and 12d generates a separate snoop result upon the first processor bus 20a that is indicative of the status of the first memory line 28' in its corresponding cache memory 12a, 12b, or 12d.

In step 434, since the second cache memory 14a contains a second modified copy of the first memory line 28', the combination of the request type and the generated snoop results informs the first memory controller 16a that the third memory request will generate a writeback. Therefore, the computer system 6 proceeds to step 436.

In step 436, the comparator 56 of the first memory controller 16a generates a hit signal if the second address indicates that the third memory request maps to the same memory line of the second memory 18b as a writeback stored in the writeback storage 58. Furthermore, in step 436, the storage full monitor 60 generates a full signal if the writeback storage is full. The present example assumes that the writeback that was generated in response to the second read for ownership request of step 406 has yet to be written back to the second memory 18b and that no other pending writebacks are stored in the writeback storage 58. As a result, the comparator 56 generates the hit signal since the second address maps to the first memory line 28' and the writeback stored in the first storage element 74' maps to the first memory line 28'. Further, the storage full monitor 60 does not generate the full signal since the writeback storage 58 in the preferred embodiment contains eight storage elements 74 and only the first storage element 74' is occupied.

In step 438, the bus stall controller 62 determines that the full signal was not generated in step 436. As a result, the bus stall controller 62 does not stall the first processor bus 20a and the computer system 6 proceeds to step 440. In other words, the first memory controller 16a has sufficient storage space to process a writeback regardless of whether the writeback may be collapsed with another writeback and the bus stall controller 62 has no need to stall the first processor bus 20a.

In step 440, the first memory controller 16a determines that the hit signal was generated in step 436. As a result, the computer system 6 proceeds to step 444 where the writeback storage 58 is configured to collapse the writeback generated in response to the third memory request with the writeback stored in the writeback storage 58.

The latched second address in step 444 is written over the address stored in the first storage element 74'. Furthermore, the data portion of the first storage element 74' is configured to store the second modified copy of the first memory line 28' during the data phase of the third memory request.

Then, the second processor 12b transfers, during the data phase of step 446, the second modified copy of the first memory line 28' from the second cache line 24" to a third cache line 24'" of the third cache memory 14c. The transfer of the second modified copy of the first memory line 28' during the data phase of the first processor bus 20a also causes the second modified copy of the first memory line 28' to overwrite the first modified copy of the first memory line 28' in the writeback storage 58.

As a result of replacing the first modified copy of the first memory line 28' with the second modified copy of the second memory line 28', the first memory controller 16a, in order to maintain coherency, need only transfer the second modified copy of the first memory line 28' back across the interconnection bus 9 to the second memory controller 16b for writing to the second memory 18b. As should be appreciated, the overwriting or collapsing of writebacks in the first memory controller 16a and the second memory controller 16b reduces the amount of data transfer traffic across first memory bus 22a, the second memory bus 22b, and the interconnection bus 9, thus increasing the efficiency of these shared resources.

Furthermore, it should be appreciated from the above description of the exemplary series of memory requests 400 that the writeback collapsing circuitry 50 is especially useful for collapsing writebacks to a memory 18a or 18b that is remote from the memory controller 16a or 16b that receives the writeback. This is especially true since the memory controller 16a or 16b that receives the writeback needs to arbitrate for the interconnection bus 9 before propagating the writeback through to the remote memory controller 16a or 16b. A considerable amount of time may pass between receiving the writeback and gaining access to the interconnection bus 9. As a result, receiving memory controller 16a or 16b may easily receive and collapse other writebacks to the same memory line prior to propagating the writeback through to the remote memory controller 16a or 16b.

While the writeback collapsing circuitry 50 is especially useful for collapsing writebacks to a remote memory 18a or 18b, the writeback collapsing circuitry 50 may also be useful for collapsing writebacks to a local memory 18a or 18b. Since the local memory controller 16a or 16b is the only device coupled to its respective local memory 18a or 18b, the local memory controller 16a or 16b need not arbitrate for access to its local memory 18a or 18b. As a result, the latency between receiving a writeback and writing it to a local memory 18a or 18b should not be nearly as long as propagating a writeback to the remote memory 18a or 18b. As a result, the writeback collapsing circuitry 50 will probably have less opportunities for receiving additional writebacks to collapse before writing data back to its local memory 18a or 18b. However, any collapsing of writebacks to the local memory 18a or 18b will reduce data traffic across its respective local memory bus 22a or 22b, thus increasing the performance of the computer system 6.

Figure 5B:
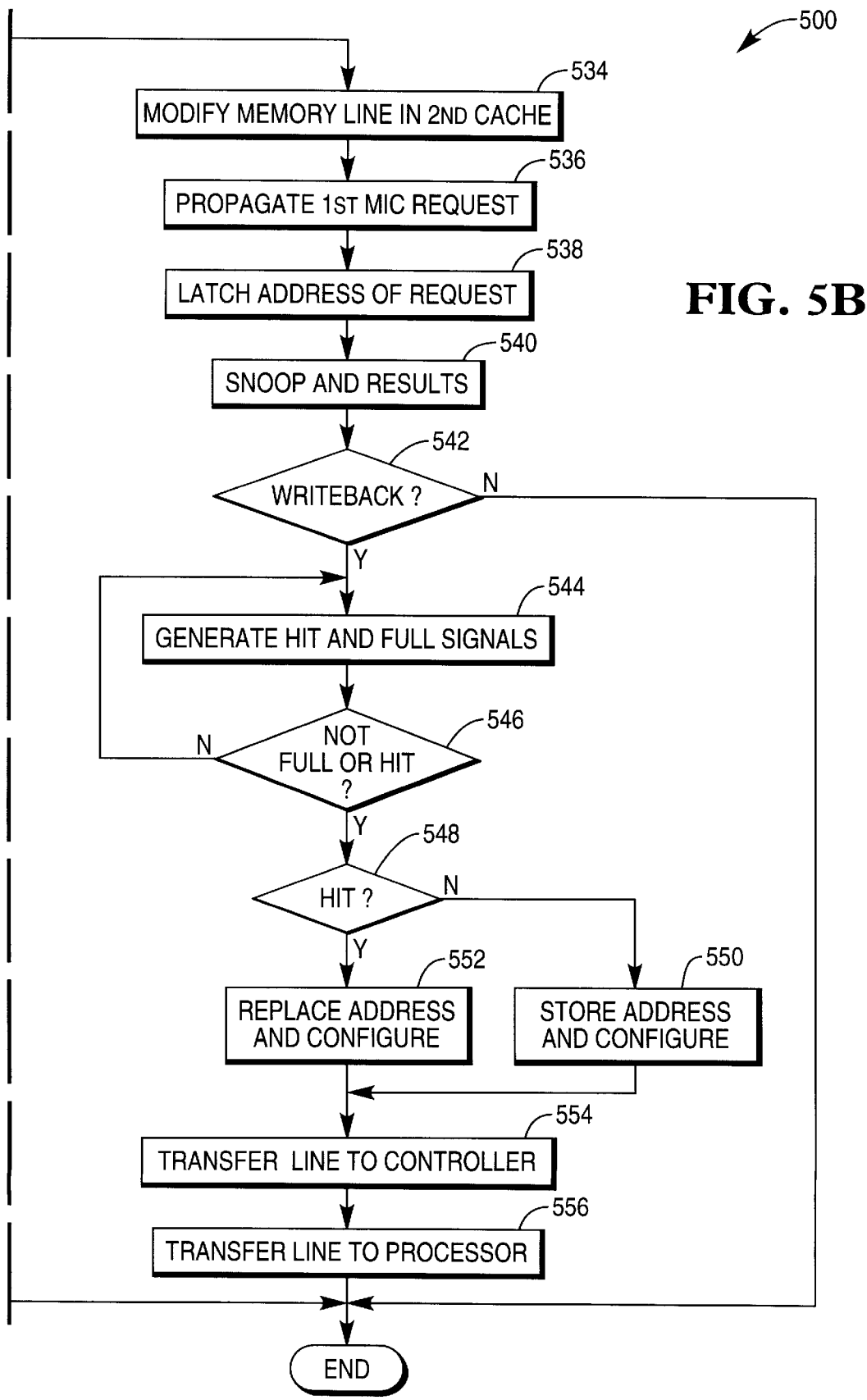

Shown in FIG. 5 is a flowchart of an exemplary series of memory requests 500 that illustrates how the writeback collapsing method 300 resolves a memory request deadlock situation. The following description of the exemplary series of memory request 500 assumes that first data is stored in a first memory location 30' of the second memory 18b and that no writebacks are stored in the writeback storage 58 of the second memory controller 16b.

In step 502, a first processor 12a of the first caching agents 10a issues upon the first processor bus 20a a first read for ownership request that targets a first memory location 30'. Assuming that the second memory 18b contains the only valid copy of the first memory location 30', the information stored in a first memory line 28' which includes the first data stored in the first memory location 30' is transferred from the second memory 18b to a first cache line 24' of a first cache memory 14a. The first word 26' of the first cache line 24' now contains a valid copy of the first data stored in the first memory location 30'. Furthermore, since the first processor 12a issued a read for ownership request in step 502, the first cache line 24' is marked as being in the exclusive state, and the second MLST 19b is updated to indicate that the first memory line 28' is owned remote.

The first processor 12a then in step 504 generates second data for the first memory location 30' by modifying the copy of the first memory location 30' in its corresponding first cache memory 14a (i.e. by writing the second data over the first data stored in first word 26' of first cache line 24'). As a direct result of modifying the copy of the first memory location 30', the copy of the first memory line 28' which is stored in the first cache line 24' is also modified. Therefore, the first cache line 24' is marked in the first cache memory 14a as being in the modified state.

In step 506, a fifth processor 12e of the second group of caching agents 10b desires to modify a second memory location 30" which is also a part of the first memory line 28'. However, due to the coherency rules of the preferred embodiment, the fifth processor 12e may only modify those memory lines 28 which are stored in its corresponding fifth cache memory 14e in an exclusive state or a modified state. Therefore, in order to obtain an exclusive state copy of the second memory location 30", the fifth processor 12e issues upon the second processor bus 20b a second read for ownership request that targets the second memory location 30". In particular, the fifth processor 12e during the request phase of the second processor bus 20b places a first address upon the second processor bus 20b which maps to the second memory location 30" and therefore also maps to the first memory line 28'. Also, during the request phase, the fifth processor 12e places a request type on the second processor bus 20b that indicates that the fifth processor 12e desires to perform a read for ownership request.

In response to the fifth processor 12e issuing the second memory request upon the second processor bus 20b, the second memory controller 16b receives in step 508 the first address and the request type for the second memory request. Once the second memory controller 16b decides to process the second memory request, the second memory controller 16b checks the second MLST 19b and updates the second MLST 19b to indicate that the first memory line 28' is owned local. By checking the second MLST 19b, the second memory controller 16b determines that the first memory line 28' was owned remote. As a result of the first memory line 28' being owned remote, the second memory controller 16b issues in step 509 a first MIC request (i.e. a coherency request) upon the interconnection bus 9 in order to retrieve the latest copy of the first memory line 28' and to invalidate any copy of the first memory line 28' contained in the cache memories 14a–14d of the first group of caching agents 10a. It should be appreciated from the above that the first MIC request is essentially a read and invalidate request that includes the first address of the second memory request.

Furthermore, since the first memory line 28' is owned remote, no caching agent of the second group of caching agents 10b will generate a writeback in response to the second read for ownership request, and the second memory controller 16b is free to defer the data phase of the second memory request until a later time. Therefore, the second memory controller 16b issues a response during the response phase that indicates that the data phase will be deferred until a later time. Furthermore, the second memory controller 16b will retry all subsequent memory requests to the first memory line 28' if the subsequent memory requests may be retried and the first MIC request is still pending. It should be appreciate that, from the above mentioned coherency rules, the second memory controller 16b may not retry MIC request or a memory request that generates a local writeback. As a result, the first memory controller 16a will be forced to process subsequent MIC requests or local writeback generating memory requests to the first memory line 28' even though the first memory controller 16a would be more simple to implement if all subsequent memory requests to the first memory line 28' could be retried until the first MIC request completed. However, since the first memory line 28' was owned remote prior to the first MIC request, no caching agent of the second group of caching agents 10b could generate a writeback to the first memory line 28' prior to the completion of the first MIC request without violating the coherency rules of the computer system 6.

In response to the second memory controller 16b issuing the first MIC request upon the interconnection bus 9, the first memory controller 16a receives in step 510 the first MIC request which includes the first address of the second memory request and a request type indicating that the request is a MIC request. Once the first memory controller 16a receives the first MIC request, the first memory controller 16a marks in the first memory controller 16a the first memory line 28' targeted by the first MIC request as being in the transient state. Furthermore, upon receiving the first memory request, the first memory controller retries all subsequent memory requests to the first memory line 28' if the subsequent memory request may be retried and the first MIC request is still pending. It should be appreciated that, from the above mentioned coherency rules, the first memory controller 16a may not retry a MIC request or a memory request that generates a local writeback. As a result, the first memory controller 16a will be forced to process subsequent local writeback generating requests to the first memory line 28' even though the first memory controller 16a would be more simple to implement if all subsequent memory request to the first memory line 28' could be retried until the first MIC request completed.

Once the first memory controller 16a decides to process the first MIC request, the first memory controller 16a determines from the first address of the first MIC request that the first MIC request targets a memory line 28 that is remote from the first memory controller 16b. As a result, the first memory controller 16a will need to propagate the first MIC request through to the first processor bus 20a in order to obtain and invalidate any copy of the first memory line 28' that may be stored in the cache memories 12a–12d of the first group of caching agents 10a. In order to propagate the first MIC request through to the first processor bus 20a, the first memory controller 16a must first arbitrate for land be granted access to the first processor bus 20a.

However, before the first memory controller 16a is granted access to the first processor bus 20a in order to propagate the first MIC request, the second processor 12b of the first group of caching agents is granted the first processor bus 20a in step 511. Upon being granted access to the first processor bus 20a, the second processor 12b issues a third read for ownership request for the first memory location 30' which is a part of the first memory line 28' (step 512). In response to the second processor 12b issuing the third read memory request, the first memory controller 16a receives (a) a request type indicating that the third memory request is a read for ownership request and (b) a second address that maps to the first memory location 30' and therefore the first memory line 28'.

In step 514, the first memory controller 16a selects the third read for ownership memory request for processing. Once the first memory controller 16a decides to process the third memory request, the first memory controller 16a determines from the second address that the third memory request targets a memory line 28 that is (a) remote from the first memory controller 16b and (b) marked as being in the transient state due to the first MIC request having yet to complete. As a result, the first memory controller 16a will in order to avoid a deadlock situation either (a) defer or retry the third memory request if the third memory request does not generate a local writeback, or (b) utilize the writeback collapsing method 300 of FIG. 3 if the third memory request does generate a local writeback. In either case, the first memory controller 16a will not propagate the third memory request through to the interconnection bus 9 until the first MIC request completes and the first memory line 28' is no longer marked as being in the transient state. Also in response to selecting the third memory request, the first address latch 52 of the first memory controller 16a latches the second address of the third read for ownership request in case the third memory request does generate a local writeback (step 516).

During the snoop phase of the third memory request, each non-requesting processor 12a, 12c, and 12d of the first group of caching agents 10a in step 518 determines from the second address of the third memory request and information stored in its corresponding cache memory 14a, 14c, or 14d whether it must take some action in response to the third memory request (e.g. invalidate a cache line 24 or supply a modified copy of the first memory line 28'). Furthermore, each non-requesting processor 12a, 12c, and 12d generates a separate snoop result upon the first processor bus 20a that is indicative of the status of the first memory line 28' in its corresponding cache memory 12a, 12c, or 12d.

In step 520, since the first cache memory 14a contains a first modified copy of the first memory line 28', the combination of the request type and the generated snoop results informs the first memory controller 16a that the third memory request will generate a local writeback to the first memory line 28'. Therefore, the first memory controller 16a will not be able to retry or defer the third read for ownership request. The computer system 6 then proceeds to step 522.

As a result of the above memory requests, a deadlock situation would occur if the writeback collapsing method 300 were not employed. Since the third memory request precedes the first MIC request on the first processor bus 20a, the third memory request must resolve on the first processor bus 20a before the first MIC request can resolve on the first processor bus 20a. However, without the writeback collapsing method 300 and the writeback collapsing circuitry 50, the third memory request would have to be propagated through the first memory controller 16a to the interconnection bus 9 in order for the third memory request to resolve. Since the first MIC request would precede the third memory request on the interconnection bus 9, the first MIC request would have to resolve prior to the third memory request being resolved. Therefore, the third memory request would block the first MIC request from completing on the first processor bus 20a and the first MIC request would block the third memory request from completing on the interconnection bus 9. In other words, a circular dependency has occurred which the first memory controller 16a must resolve by breaking one of the dependencies. The writeback collapsing circuitry 50 allows the first memory controller 16a to break one of these dependencies while still retaining coherency.

In step 522, the comparator 56 of the first memory controller 16a generates a hit signal if the first address indicates that the memory request maps to the same memory line of second memory 18b as a writeback stored in the writeback storage 58. Furthermore, in step 522, the storage full monitor 60 generates a full signal if the writeback storage is full. Since the present example assumes that no pending writebacks were stored in the writeback storage 58 prior to the third memory request of step 512, the comparator 56 does not generate the hit signal and the storage full monitor 60 does not generate the full signal.

In step 524, the bus stall controller 62 determines that the full signal was not generated in step 522. As a result, the bus stall controller 62 does not stall the first processor bus 20a and the computer system 6 proceeds to step 526. In other words, the first memory controller 16a has sufficient storage space to process a writeback regardless of whether the writeback may be collapsed with another writeback and the bus stall controller 62 has no need to stall the first processor bus 20a.

In step 526, the first memory controller 16 determines that the hit signal was not generated in step 522. As a result, the computer system 6 proceeds to step 530 where the writeback storage 58 is configured to store a writeback in an empty storage element 74 of the writeback storage 58.

The latched second address in step 530 is stored in an empty location in the address store 68 of the writeback storage 58. Furthermore, the corresponding location in the data store 70 is configured to store the first modified copy of the first memory line 28' during the data phase of the third memory request. In particular, the first address is stored in the address portion of a first storage element 74' and the corresponding data portion of the first storage element 74' is configured to store the first modified copy of the memory line 28', during the data phase of the third memory request.

After the writeback storage 58 is properly configured, the first processor 12a during the data phase of step 532 transfers the first modified copy of the first memory line 28' from the first cache line 24' to a second cache line 24" of the second cache memory 14b. The transfer of the first modified copy of the first memory line 28' during the data phase of the first processor bus 20a also causes the first modified copy of the first memory line 28' to be stored in the data portion of the first storage element 74' since the data store 70 was configured in step 530 to receive the first modified copy of the first memory line 28'.

After step 532, the second cache line 24" contains a valid copy of the first memory line 28' and is marked as being in the exclusive state since the second processor 12b issued a read for ownership request in step 512. In particular, a second word 26" of the second cache line 24" contains a copy of the second data for the first memory location 30' and a third word 26''' contains a copy of whatever was stored in the second memory location 30". The second processor 12b then in step 534 generates third data for the first memory location 30" by writing the third data to the second word 26" of the second cache line 24". As a direct result of writing the third data to the second word 26", the copy of the first memory line 28' stored in the second cache line 24" is also modified. Therefore, the second cache line 24" is marked as being in the modified state.

In step 536, the first memory controller 16a obtains access to the first processor bus 20a and propagates the first MIC request upon the first processor bus 20a. Furthermore, in response to propagating the first MIC request, the address latch 52 latches the first address of the first MIC request (step 538).

During the snoop phase of step 540, each non-requesting processor 12a, 12b, 12c, and 12d of the first group of caching agents 10a determines from the first address of the first MIC request and information stored in its corresponding cache memory 14a, 14b, 14c, or 14d whether it must take some action in response to the first MIC request (e.g. invalidate a cache line 24 or supply a modified copy of the first memory line 28'). Furthermore, each non-requesting processor 12a, 12b, 12c, and 12d of the first group of caching agents 10a generates a separate snoop result upon the first processor bus 20a that is indicative of the status of the first memory line 28' in its corresponding cache memory 12a, 12b, 12c, or 12d.

In step 542, since the second cache memory 14a contains a second modified copy of the first memory line 28', the combination of the request type of the first MIC request and the generated snoop results informs the first memory controller 16a that the present request will generate a writeback. Therefore, the computer system 6 proceeds to step 544.

In step 544, the comparator 56 of the first memory controller 16a generates a hit signal if the first address indicates that the first MIC request maps to the same memory line of the second memory 18b as a writeback stored in the writeback storage 58. Furthermore, in step 544, the storage full monitor 60 generates a full signal if the writeback storage 58 is full. Since the write status monitor 64 of the first memory controller 16a prevents writebacks that target memory lines 28 that are also targeted by pending MIC requests from being transferred to the second memory controller 16b, the writeback that was generated in response to the third memory request has yet to be written back to the second memory 18b. As a result, the comparator 56 generates the hit signal since the first address maps to the first memory line 28' and the writeback stored in first storage element 74' maps to the first memory line 28'. Furthermore, the storage full monitor 60 does not generate the full signal since the writeback storage 58 in the preferred embodiment contains eight storage elements 74 and only the first storage element 74' is occupied.

In step 546, the bus stall controller 62 determines that the full signal was not generated in step 544. As a result, the bus stall controller 62 does not stall the first processor bus 20a and the computer system 6 proceeds to step 548. In other words, the first memory controller 16a has sufficient storage space to process a writeback regardless of whether the writeback may be collapsed with another writeback and the bus stall controller 62 has no need to stall the first processor bus 20a.

In step 548, the first memory controller 16a determines that the hit signal was generated in step 544. As a result, the computer system 6 proceeds to step 552 where the writeback storage 58 is configured to collapse the writeback generated in response to the first MIC request with the writeback stored in the first storage element 74'.

The latched second address in step 552 is written over the address stored in the first storage element 74'. Furthermore, the data portion of the first storage element 74' is configured to store the second modified copy of the first memory line 28' during the data phase of the first MIC request.

Then, the second processor 12b transfers, during the data phase of step 554, the second modified copy of the first memory line 28' from the second cache line 24" to the first memory controller 16a. The transfer of the second modified copy of the first memory line 28' during the data phase of the first processor bus 20a also causes the second modified copy of the first memory line 28' to overwrite the first modified copy of the memory line 28' in the writeback storage 58.

Then, in step 556, the write status monitor 64 allows the first memory controller 16a to transfer the second modified copy of the first memory line 28' from the writeback storage 58 to the second memory controller 16b in order to complete the first MIC request. Upon completing the first MIC request, the first memory controller 16a and the second memory controller 16b mark the first memory line 28' as no longer being in the transient state. The second memory controller 16b then transfers the second modified copy of the first memory line 28' to a fourth cache line 24''' of the fifth cache memory 14e in order to compete the second memory request. After step 556, (1) the fifth processor 12e and corresponding fifth cache memory 14e have the latest copy of the first memory line 28' in the exclusive state, (2) the first group of caching agents 10a do not contain a valid copy of the first memory line 28', (3) the second MLST 19b properly indicates that the first memory line 28' is owned local, and (4) the second memory controller 16b has the latest copy of the first memory line 28' scheduled for writing back to the second memory 18b. In other words, the computer system 6 has maintained coherency in processing the exemplary memory requests 500.

It should be appreciated that since the interconnection bus 9, the first processor bus 20a, and the second processor bus 20b are preferably pipe-lined memory buses, several memory requests may be pending upon the buses at any give time. While the above exemplary series of memory requests 400 and 500 were essentially described in a sequential manner where a second memory request was initiated by the memory controllers 16a and 16b after a first memory request completed, this sequential description was used to merely simplify the description. In other words, the three memory requests of exemplary series 400 may have all been in progress on the first processor bus 20a simultaneously, but in different phases. Likewise, the memory requests and the MIC request of exemplary series 500 may have all been in progress simultaneously, but in different phases.

Furthermore, since writebacks in the preferred embodiment may not be deferred or retried, the stalling of the first processor bus 20a ensures that the first memory controller 16a has available storage capacity for storing a normal writeback or an implicit writeback until the information is actually written back to the first memory 18a. In other words, the stalling of the processor buses 20a and 20b ensures that no writebacks are lost due to lack of storage in the memory controllers 16a and 16b. It should be appreciated that the above writeback collapsing method 300 may be modified to stall the processor buses 20a and 20b after different phases of the processor buses 20a and 20b or when different conditions occur. Furthermore, it should be appreciated that modifications to the writeback collapsing circuitry 50 may require that the processor buses 20a and 20b be stalled after different phases or different conditions. The above method 300 basically stalls the processor buses 20a and 20b after the snoop phase of a memory request; however, the writeback collapsing circuitry 50 could stall prior to the resolution of the snoop phase by stalling the processor buses 20a and 20b as soon as the writeback storage 58 for the local memory controller 16a or 16b is full. Furthermore, the writeback collapsing circuitry 50 could be configured to stall the processor buses 20a and 20b in response to the address store 68 or the data store 70 or the local memory controller 16a or 16b being full.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method used by a memory controller to prevent deadlock of requests to a memory having a memory line, comprising:

receiving a first memory request for the memory line from a first bus;

receiving a second memory request for the memory line from a second bus;

propagating the first memory request through to the second bus after receiving the second memory request;

processing the second memory request by storing a first modified copy of the memory line in the memory controller;

processing the first memory request by (a) storing a second modified copy of the memory line in the memory controller, and (b) transferring the second modified copy of memory line to a caching agent in order to satisfy the first memory request, and comparing one of the first and second memory requests with a data structure having stored therein a plurality of pending memory update requests, and collapsing said request into a single write.

2. The method of claim 1, wherein:

processing the first memory request comprises determining that the first memory request is a certain type of memory request that is not to be deferred and not to be retried and processing the first memory request, and processing the second memory request comprises determining that the second memory request is the certain type of memory request that is not to be deferred and not to be retried and processing the second memory request.

3. The method of claim 1, wherein:

processing the first memory request comprises determining from a first coherency phase of the first memory request that data is to be written to the memory and the processing the first memory request, and processing the second memory request comprises determining from a second coherency phase of the second memory request that data is to be written to the memory and processing the second memory request.

4. The method of claim 1, wherein:

processing the first memory request comprises determining that the first memory request is a certain type of memory request that is not to be deferred and not to be retried and processing the first memory request, and processing the second memory request comprises determining from a coherency phase of the second memory request that data is to be written to the memory and processing the second memory request.

5. The method of claim 1, wherein:

processing the first memory request comprises determining that the first memory request is a second coherency request that is not to be deferred and not to be retried and processing the first memory request, and processing the second memory request comprises determining from a coherency phase of the second memory request that data is to be written to the memory and processing the second memory request.

6. The method of claim 1, wherein propagating the first memory request comprises marking the memory line as being in a transient state, and wherein processing the first memory request comprises removing the memory line from the transient state.

7. The method of claim 1, wherein processing the first memory request comprises storing the second modified copy of the memory line over the first modified copy of the memory line, further comprising:

transferring the second modified copy of the memory line to a second memory controller in order to be written to the memory.

8. The method of claim 1, wherein comparing one of the first and second memory requests with a data structure having stored therein a plurality of memory update requests further comprises:

updating the data structure having stored the plurality of memory update requests if the first memory request is invalid in main memory, and transferring the plurality of memory update requests to main memory.

9. The method of claim 6, wherein removing the memory line from the transient state further comprises:

receiving a third memory request for the memory line from a second bus prior to receiving the second memory request, and retrying the third memory request if the memory line is marked as being in the transient state.

10. An apparatus to prevent deadlock of memory requests comprising:

a memory coupled to a first bus;

a memory controller coupled to the first bus and a second bus, the memory controller receiving a first memory request for a memory line, in the memory from the first bus and receiving a second memory request for the memory line from the second bus; the memory controller further comprising a circuit to update and collapse a data structure having stored therein a plurality of memory update requests into a single update request.

11. The apparatus of claim 10, wherein:

the circuit is coupled to the memory and transfers the data structure having stored therein the plurality of memory update requests to the memory.

* * * * *